(12) United States Patent
Jung et al.

(10) Patent No.: US 9,741,305 B2
(45) Date of Patent: Aug. 22, 2017

(54) DEVICES AND METHODS OF ADAPTIVE DIMMING USING LOCAL TONE MAPPING

(71) Applicant: Apple Inc., Cupertino, CA (US)

(72) Inventors: Tobias Jung, Munich (DE); Marc Albrecht, San Francisco, CA (US); Sandro H. Pintz, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 43 days.

(21) Appl. No.: 14/818,001

(22) Filed: Aug. 4, 2015

(65) Prior Publication Data

US 2017/0039967 A1 Feb. 9, 2017

(51) Int. Cl.
*G09G 3/36* (2006.01)
*G06T 5/40* (2006.01)
*G09G 3/20* (2006.01)
*G09G 3/34* (2006.01)

(52) U.S. Cl.
CPC .............. *G09G 3/3648* (2013.01); *G06T 5/40* (2013.01); *G09G 3/3406* (2013.01); *G09G 3/3426* (2013.01); *G09G 2320/0233* (2013.01); *G09G 2320/066* (2013.01); *G09G 2320/0646* (2013.01); *G09G 2360/16* (2013.01)

(58) Field of Classification Search
CPC ....... G09G 3/3648; G09G 3/2003; G06T 5/40
See application file for complete search history.

(56) References Cited

U.S. PATENT DOCUMENTS

| | | | |
|---|---|---|---|
| 8,094,118 B2 | 1/2012 | Pedram et al. | |
| 8,378,959 B2 | 2/2013 | Yeo et al. | |
| 8,803,790 B2 | 8/2014 | Wasinger et al. | |
| 8,810,501 B2 | 8/2014 | Budzelaar et al. | |
| 8,902,149 B2 | 12/2014 | Kerofsky | |
| 2007/0269132 A1* | 11/2007 | Duan | G06T 5/007 382/274 |
| 2010/0329557 A1* | 12/2010 | Wang | G06K 9/6223 382/171 |
| 2014/0078193 A1* | 3/2014 | Barnhoefer | G09G 3/3406 345/690 |
| 2015/0002559 A1* | 1/2015 | Fujine | G09G 3/3426 345/690 |

\* cited by examiner

*Primary Examiner* — Charles Hicks
(74) *Attorney, Agent, or Firm* — Fletcher Yoder PC

(57) ABSTRACT

Methods, systems, and devices for improving contrast, dynamic range, and power consumption of a backlight in a display are provided. By way of example, a method includes receiving image data to be displayed on pixels of a display panel, generating a global histogram of the image data, generating a plurality of thresholds based on the global histogram, and defining a first threshold and a second threshold of the plurality of thresholds as local thresholds based on the global histogram and a local histogram. The first threshold and the second threshold are generated according to a local tone mapping function. The method further includes adjusting a luminance of one or more of pixels of the display panel based at least in part on the first threshold and the second threshold.

29 Claims, 18 Drawing Sheets

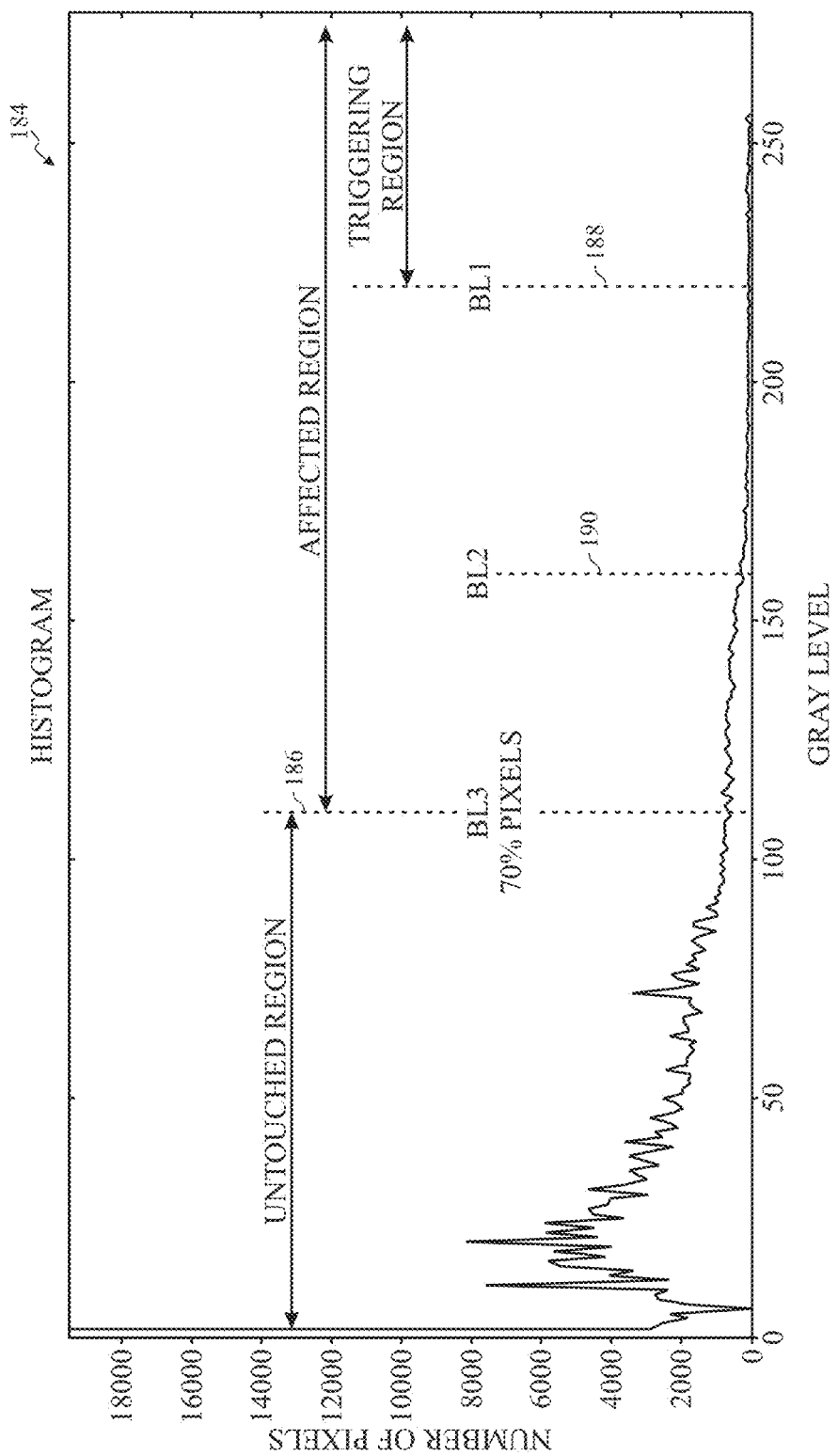

DEVICES AND METHODS OF ADAPTIVE DIMMING USING LOCAL TONE MAPPING

BACKGROUND

This disclosure relates to increasing image pixel brightness values while lowering backlight intensity, thereby saving power while reducing the possibility of image artifacts.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Liquid crystal displays (LCDs) are commonly used as screens or displays for a wide variety of electronic devices, including such consumer electronics as televisions, computers, and handheld devices (e.g., cellular telephones, audio and video players, gaming systems, and so forth). Such LCD devices typically provide a flat display in a relatively thin package that is suitable for use in a variety of electronic goods. In addition, such LCD devices typically use less power than comparable display technologies, making them suitable for use in battery-powered devices or in other contexts where it is desirable to minimize power usage.

Often, some LCDs may employ certain dimming techniques to improve contrast and dynamic range in the LCDs. However, these dimming techniques may have limited power saving capability, and may further engender the possibility of clipping artifacts becoming apparent on the LCD. For example, in displayable images including a transition from darker image content to brighter image content may produce backlight flashing artifacts or washed-out pixels, which may be both apparent and undesirable to a user. It may be useful to provide more advanced dimming techniques.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Various embodiments of the present disclosure relate to methods, systems, and devices for improving contrast and dynamic range and reducing the power of the backlight in liquid crystal displays (LCDs). By way of example, a method includes receiving image data to be displayed on pixels of a display panel, generating a global histogram of the image data, generating a plurality of thresholds based on the global histogram, and defining a first threshold and a second threshold of the plurality of thresholds as local thresholds based on the global histogram and a local histogram. The first threshold and the second threshold are generated according to a local tone mapping function. The method further includes adjusting a luminance of one or more of the pixels of the display panel based at least in part on the first threshold and the second threshold. By reducing the backlight while also preserving local contrast, substantial power may be saved while avoiding the appearance of display artifacts.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various aspects of this disclosure may be better understood upon reading the following detailed description and upon reference to the drawings in which:

FIG. 12 is a plot diagram illustrating an example of a pixel map or a local histogram of a horizontal segments of pixels of the display of FIG. 1, in accordance with an embodiment;

DETAILED DESCRIPTION

Figure 1:
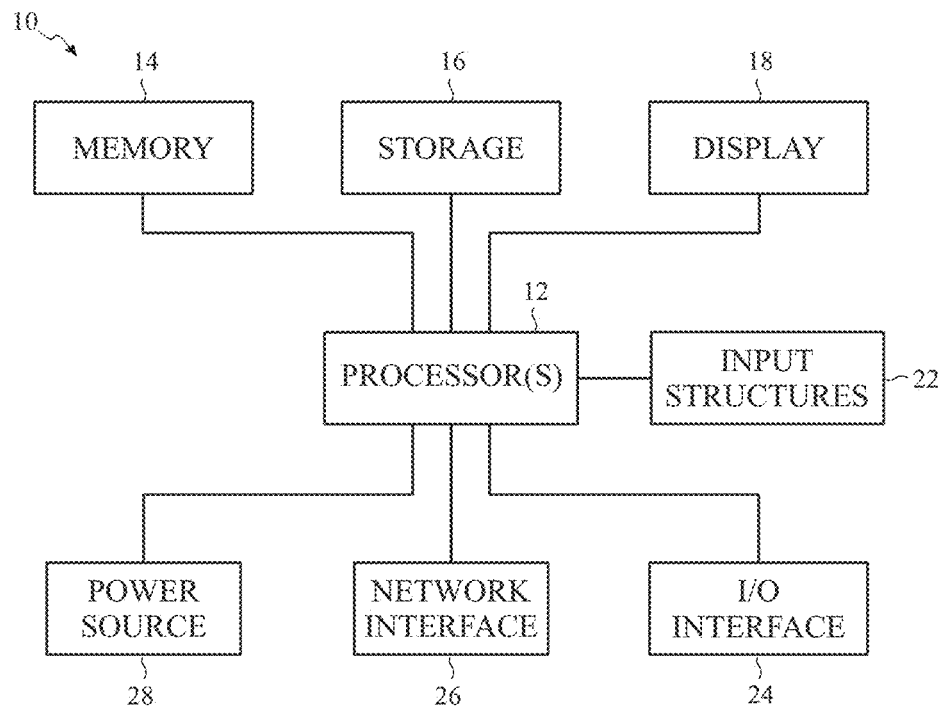
FIG. 1 is a schematic block diagram of an electronic device including a display, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure relate to methods, systems, and devices for improving contrast and dynamic range and reducing the power of the backlight in liquid crystal displays (LCDs). Indeed, the present embodiments may include an adaptive dimming technique utilizing a local tone mapping function. In certain embodiments, the present adaptive dimming techniques may include receiving pixel data, and generating a global histogram based on the pixel data. The adaptive dimming technique may further include defining global thresholds (e.g., global backlight thresholds). For example, based on the global histogram, three thresholds (e.g., $BL_1$, $BL_2$, and $BL_3$), as well as the target backlight brightness level, may be defined and generated. In certain embodiments, the global backlight levels $BL_1$ and $BL_2$ may be then locally adapted based on the global values and a local histogram (e.g., based on a local segment of pixels) and local tone mapping function. Lastly, based on the locally adapted backlight levels $BL_1$ and $BL_2$ and the global backlight level $BL_3$, incoming pixel data may be modified to increasing the brightness values of some of the pixels while preserving local contrast between the modified pixels and neighboring pixels. In this way, the present adaptive dimming techniques with local tone mapping may reduce possible image errors (e.g., clipping errors, halo artifacts, and so forth) and power consumption while providing a high contrast ratio.

With the foregoing in mind, a general description of suitable electronic devices that may include a display and data processing circuitry useful in improving contrast and dynamic range and reducing the power of the backlight in liquid crystal displays (LCDs). Turning first to FIG. 1, an electronic device 10 according to an embodiment of the present disclosure may include, among other things, one or more processor(s) 12, memory 14, nonvolatile storage 16, a display 18 input structures 22, an input/output (I/O) interface 24, network interfaces 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
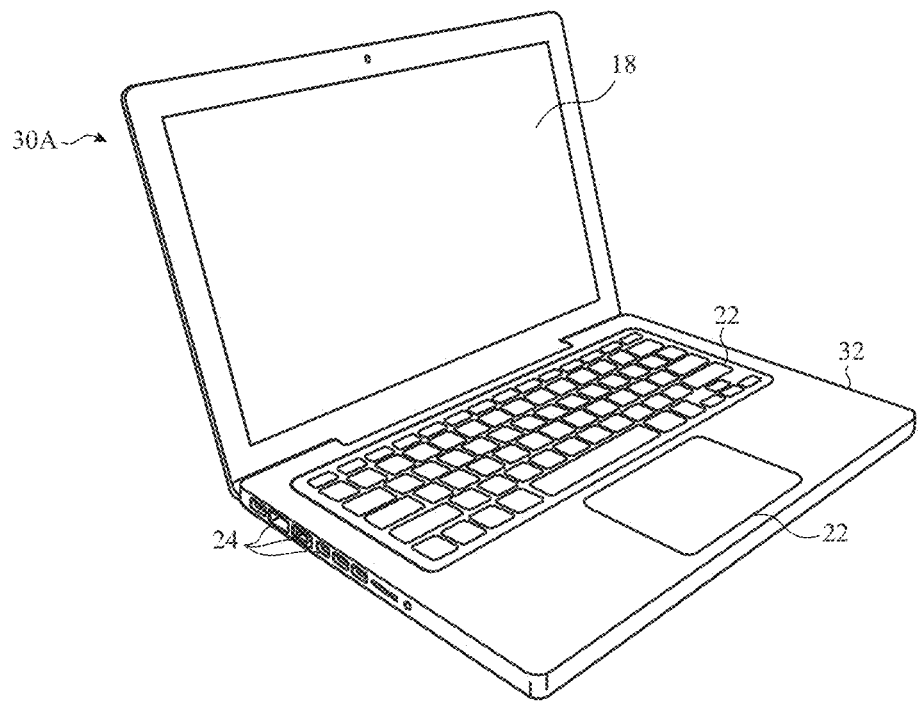
FIG. 2 is a perspective view of a notebook computer representing an embodiment of the electronic device of FIG. 1.
Figure 3:
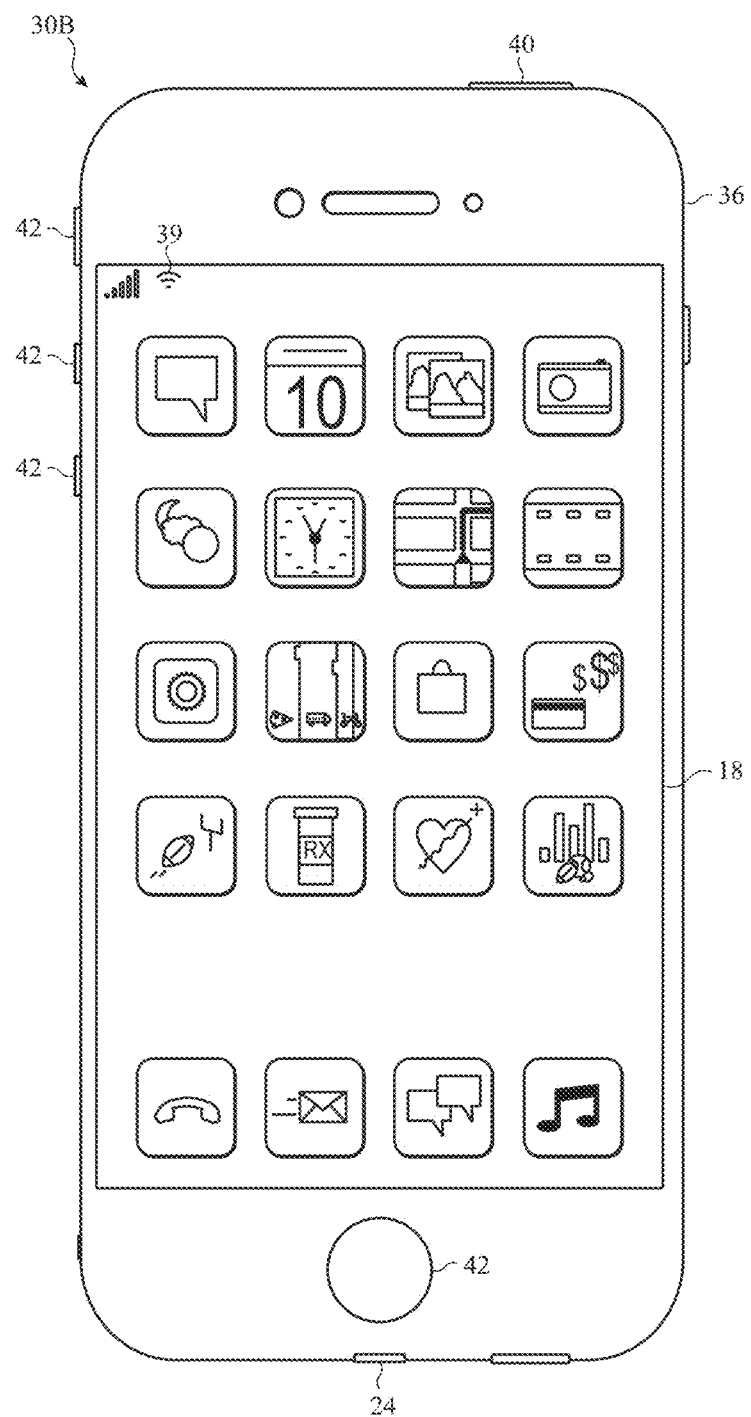
FIG. 3 is a front view of a hand-held device representing another embodiment of the electronic device of FIG. 1.
Figure 4:
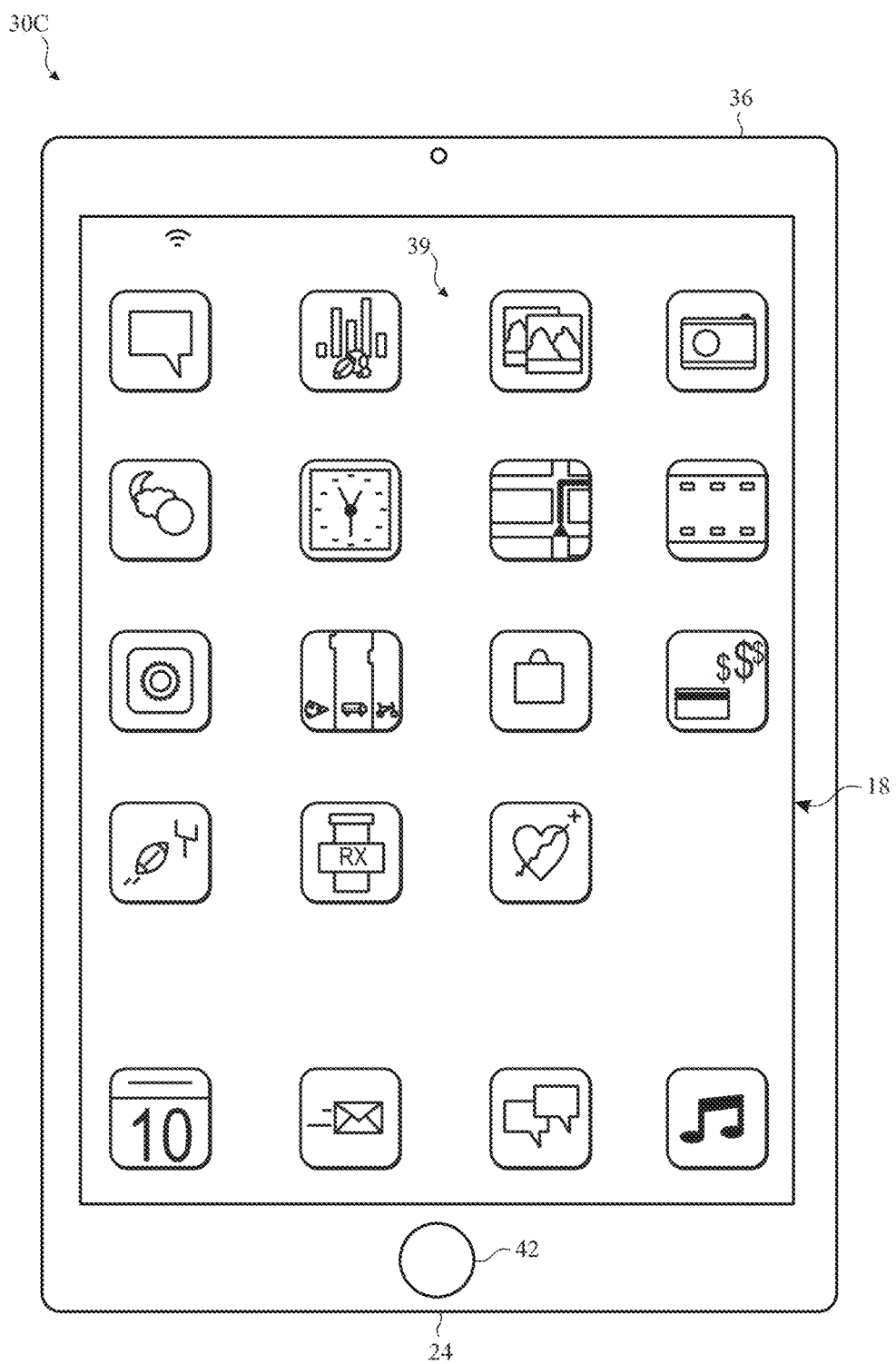
FIG. 4 is a front view of another hand-held device representing another embodiment of the electronic device of FIG. 1.
Figure 5:
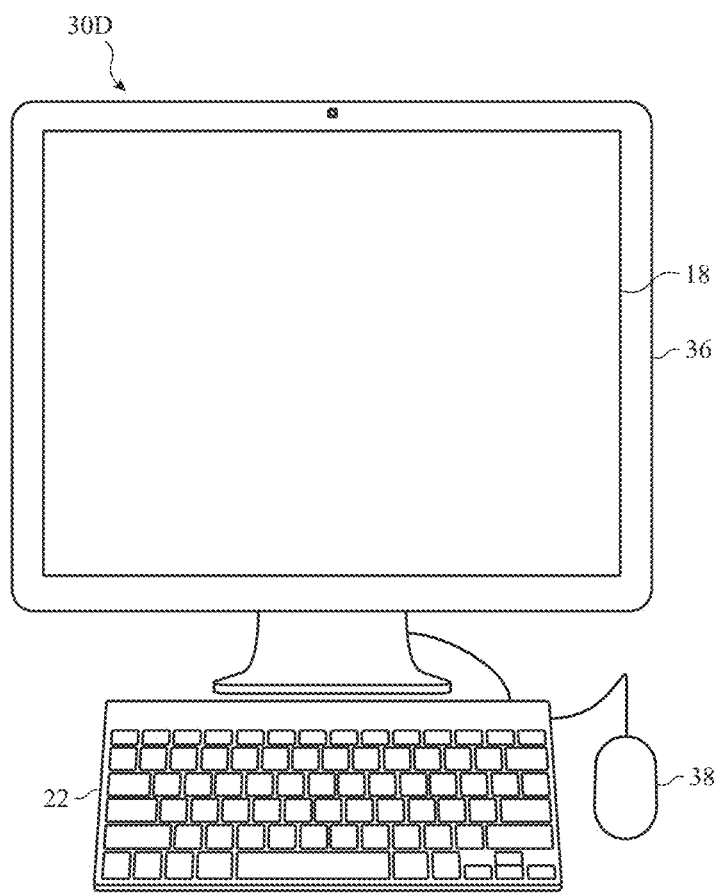
FIG. 5 is a front view of a desktop computer representing another embodiment of the electronic device of FIG. 1.

By way of example, the electronic device 10 may represent a block diagram of the notebook computer depicted in FIG. 2, the handheld device depicted in FIG. 3, the desktop computer depicted in FIG. 4, the wearable electronic device depicted in FIG. 5, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile memory 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels. Further, in some embodiments, the display 18 may include a light source (e.g., backlight) that may be used to emit light to illuminate displayable images on the display 18. Indeed, in some embodiments, as will be further appreciated, the light source (e.g., backlight) may include any type of suitable lighting device such as, for example, cold cathode fluorescent lamps (CCFLs), hot cathode fluorescent lamps (HCFLs), and/or light emitting diodes (LEDs), or other light source that may be utilize to provide highly backlighting.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN) or wireless local area network (WLAN), such as an 802.11x Wi-Fi network, and/or for a wide area network (WAN), such as a $3^{rd}$ generation (3G) cellular network, $4^{th}$ generation (4G) cellular network, or long term evolution (LTE) cellular network. The network interface 26 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra Wideband (UWB), alternating current (AC) power lines, and so forth.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30A, is illustrated in FIG. 2 in accordance with one embodiment of the present disclosure. The depicted computer 30A may include a housing or enclosure 32, a display 18, input structures 22, and ports of an I/O interface 24. In one embodiment, the input structures 22 (such as a keyboard and/or touchpad) may be used to interact with the computer 30A, such as to start, control, or operate a GUI or applications running on computer 30A. For example, a keyboard and/or touchpad may allow a user to navigate a user interface or application interface displayed on display 18.

FIG. 3 depicts a front view of a handheld device 30B, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif.

The handheld device 30B may include an enclosure 36 to protect interior components from physical damage and to shield them from electromagnetic interference. The enclosure 36 may surround the display 18, which may display indicator icons 39. The indicator icons 39 may indicate, among other things, a cellular signal strength, Bluetooth connection, and/or battery life. The I/O interfaces 24 may open through the enclosure 36 and may include, for example, an I/O port for a hard wired connection for charging and/or content manipulation using a standard connector and protocol, such as the Lightning connector provided by Apple Inc., a universal service bus (USB), or other similar connector and protocol.

User input structures 42, in combination with the display 18, may allow a user to control the handheld device 30B. For example, the input structure 40 may activate or deactivate the handheld device 30B, the input structure 42 may navigate user interface to a home screen, a user-configurable application screen, and/or activate a voice-recognition feature of the handheld device 30B, the input structures 42 may provide volume control, or may toggle between vibrate and ring modes. The input structures 42 may also include a microphone may obtain a user's voice for various voice-related features, and a speaker may enable audio playback and/or certain phone capabilities. The input structures 42 may also include a headphone input may provide a connection to external speakers and/or headphones.

FIG. 4 depicts a front view of another handheld device 30C, which represents another embodiment of the electronic device 10. The handheld device 30C may represent, for example, a tablet computer, or one of various portable computing devices. By way of example, the handheld device 30C may be a tablet-sized embodiment of the electronic device 10, which may be, for example, a model of an iPad® available from Apple Inc. of Cupertino, Calif.

Turning to FIG. 5, a computer 30D may represent another embodiment of the electronic device 10 of FIG. 1. The computer 30D may be any computer, such as a desktop computer, a server, or a notebook computer, but may also be a standalone media player or video gaming machine. By way of example, the computer 30D may be an iMac®, a MacBook®, or other similar device by Apple Inc. It should be noted that the computer 30D may also represent a personal computer (PC) by another manufacturer. A similar enclosure 36 may be provided to protect and enclose internal components of the computer 30D such as the display 18. In certain embodiments, a user of the computer 30D may interact with the computer 30D using various peripheral input devices, such as the input structures 22 or mouse 38, which may connect to the computer 30D via a wired and/or wireless I/O interface 24.

In certain embodiments, as previously noted above, each embodiment (e.g., notebook computer 30A, handheld device 30B, handheld device 30C, computer 30D) of the electronic device 10 may include a display 18, which may include a light source (e.g., backlight) that may be used to emit light to illuminate displayable images on the display 18. Indeed, as may be appreciated, the display 18 may be employed to render images (e.g., still images, video images, multi-media images, and so forth) to a user of the electronic device with high performance. Thus, it may be useful to monitor and adjust the operating parameters (e.g., contrast, luminance, color, viewing angle, brightness, sharpness, and so forth) of the backlight of the display 18. Indeed, as will be further appreciated with respect to FIGS. 6-17, in order to attenuate backlight brightness (e.g., luminance), increase global and local contrast of images displayed on the display 18, improve dynamic contrast, and reduce power consumption of the backlight of the display 18, it may be useful to provide one or more adaptive dimming techniques with a local tone mapping function to modulate and control the light source (e.g., backlight) of the display 18.

Figure 6:
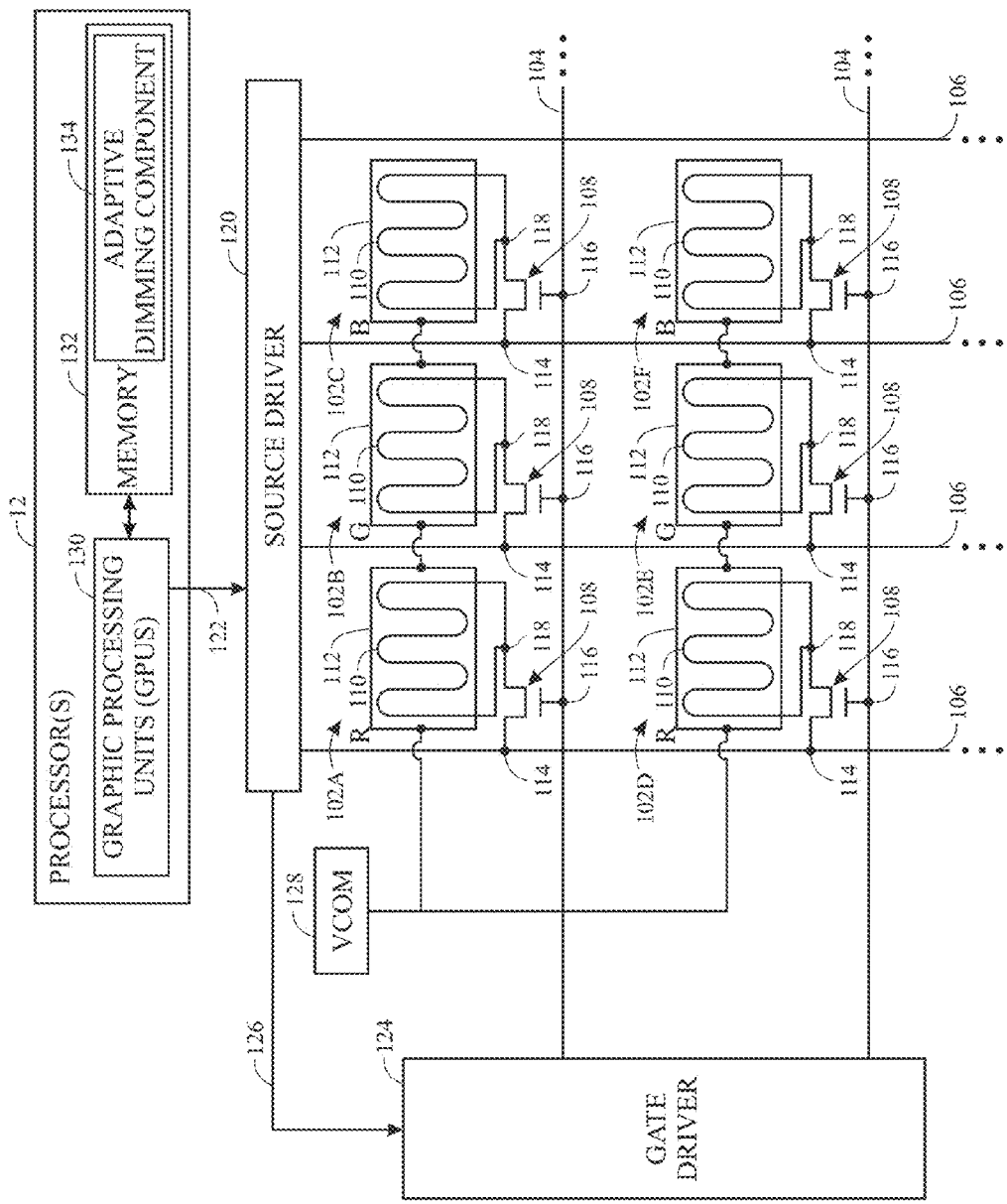
FIG. 6 is an equivalent circuit diagram of the display of FIG. 1 including an adaptive dimming component, in accordance with an embodiment.

Turning now to FIG. 6, which generally represents an equivalent circuit diagram of, for example, the TFT layer of the display 18 in accordance with some embodiments. In particular, the display 18 may include a pixel array 100. As illustrated, the pixel arrays 100 may include a number of unit pixels 102 disposed in pixel array or matrix. In these arrays, each unit pixel 102 may be defined by the intersection of rows and columns, represented by gate lines 104 (also referred to as scanning lines) and data lines 106 (also referred to as data lines), respectively. Although only 6 unit pixels 102, referred to individually by the reference numbers 102a-102f, respectively, are shown for purposes of simplicity, it should be understood that in an actual implementation, each of the data lines 106 and the gate lines 104 may include hundreds or thousands of such unit pixels 102. Each of the unit pixels 102 may represent one of three subpixels that respectively filter only one color (e.g., red, blue, or green (RGB)) of light through, for example, a color filter. For purposes of the present disclosure, the terms "pixel," "subpixel," and "unit pixel" may be used largely interchangeably.

In the presently illustrated embodiment, each unit pixel 102 may include a thin film transistor (TFT) 108 for switching a data signal stored on a respective pixel electrode 110. The potential stored on the pixel electrode 110 relative to a potential of a common electrode 112 (e.g., creating a liquid crystal capacitance $C_{LC}$), which may be shared by other pixels 102, may generate an electrical field sufficient to alter the arrangement of liquid crystal molecules (not illustrated in FIG. 6). In the depicted embodiment of FIG. 6, a source 114 of each TFT 108 may be electrically connected to a data line 106 and a gate 116 of each TFT 108 may be electrically connected to a gate line 104. A drain 118 of each TFT 108 may be electrically connected to a respective pixel electrode 110. Each TFT 108 may serve as a switching element that may be activated and deactivated (e.g., turned "ON" and turned "OFF") for a predetermined period of time based on the respective presence or absence of a scanning signal on the gate lines 104 that are applied to the gates 116 of the TFTs 108.

When activated, a TFT 108 may store the image signals received via the respective data lines 106 as a charge upon its corresponding pixel electrode 110. As noted above, the image signals stored by the pixel electrode 110 may be used to generate an electrical field between the respective pixel electrode 110 and a common electrode 112. This electrical field may align the liquid crystal molecules to modulate light transmission through the pixel 102. Furthermore, although not illustrated, it should be appreciated that each unit pixel 102 may also include a storage capacitor $C_{ST}$ that may used to sustain the pixel electrode voltage (e.g., $V_{pixel}$) during the time in which the TFTs 108 may be switch to the "OFF" state.

The display 18 may also include source driver integrated circuits (IC) 120. The source driver IC 120 may include a chip, such as a processor or application specific integrated circuit (ASIC) that controls the display pixel array 100 by receiving image data 122 (e.g., split images) from the processor(s) 12, and sending the corresponding split image signals to the unit pixels 102 of the pixel array 100. The source driver 120 may also provide timing signals 126 to, for example, a gate driver 124 to facilitate the activation/deactivation of individual rows of pixels 102. In other embodiments, timing information may be provided to the gate driver 124 in some other manner. The display 18 may or may not include a common voltage (VCOM) source 128 to provide a common voltage (VCOM) voltage to the common electrodes 112. In certain embodiments, the VCOM source 128 may supply a different VCOM to different common electrodes 112 at different times. In other embodiments, the common electrodes 112 all may be maintained at the same potential or similar potential.

In certain embodiments, as further illustrated in FIG. 6, the processor(s) 12 may include one or more graphics processing units (GPUs) 130 that may be used to generate and render images to the display 18. In one embodiment, the one or more GPUs 130 may be communicatively coupled to an internal memory 132. In certain embodiments, the internal memory 132 may store one or more adaptive dimming components 134 (e.g., adaptive dimming algorithm(s) and/or hardware components used to implement the adaptive dimming) for providing the image data 122 to the pixel array 100 of the display 18.

The adaptive dimming component 134 (e.g., adaptive dimming algorithm(s) 134 and/or hardware components used to implement the adaptive dimming) may include any code or instructions that, when executed by the GPUs 130 and/or the processor(s) 12 at large, may be useful in calculating, splitting, and processing image data to be displayed on the display 18. It should be appreciated that while the adaptive dimming component 134 may be illustrated as being executed by the GPUs 130, in other embodiments, the adaptive dimming component 134 (e.g., adaptive dimming algorithm(s) 134 and/or hardware components used to implement the adaptive dimming) may be executed by the source driver 120, or by other data processing circuitry that may be included as part of the processor(s) 12.

Figure 7:
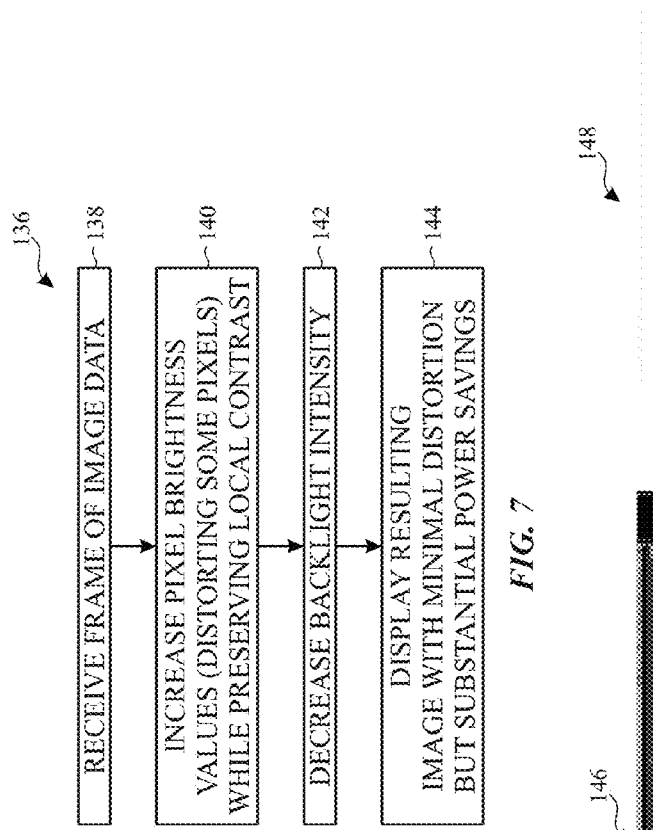
FIG. 7 is a process illustrative of the operation of the adaptive dimming component of FIG. 6, in accordance with an embodiment.

For example, FIG. 7 illustrates a process 136, which may be illustrative of the operation of the adaptive dimming component 134 as discussed above with respect to FIG. 6. The process 136 may include code or instructions stored in a non-transitory machine-readable medium (e.g., the memory 14 or the internal memory 132) and executed, for example, by the one or more processor(s) 12, the GPUs 130, and/or the source drivers 120 included within the system 10 and illustrated in FIG. 6. The process 136 may begin with the GPUs 130 receiving (block 138) one or more frames of image data. The process 136 may continue with the GPUs 130 increasing (block 140) the brightness values of some of the pixels while preserving local contrast. For example, as will be described in greater detail below, the present adaptive dimming techniques may include defining global thresholds (e.g., global backlight thresholds $BL_1$, $BL_2$, and $BL_3$) based on a global histogram, and then locally adjusting the global backlight levels $BL_1$ and $BL_2$ into local thresholds (e.g., local backlight thresholds) based on the global values and a local histogram and local tone mapping function.

The process 136 may then continue with the GPUs 130 adjusting (block 142) the intensity of the backlight of the display 18. For example, as will be discussed in greater detail below, by allowing minor distortion in the form of lost pixel contrast to be introduced to some pixels (e.g., as discussed with respect to block 140), the backlight intensity may be more aggressively reduced at (e.g., as discussed with respect to block 142). The process 136 may thus result in the GPUs 130 causing (block 144) the display 18 to display the resulting image with such relatively minimal distortion, while offering substantially improved power savings. In this way, the present adaptive dimming techniques with local tone mapping may reduce possible image errors (e.g., clipping errors, halo artifacts, and so forth) and power consumption while providing a high contrast ratio.

Figure 8:
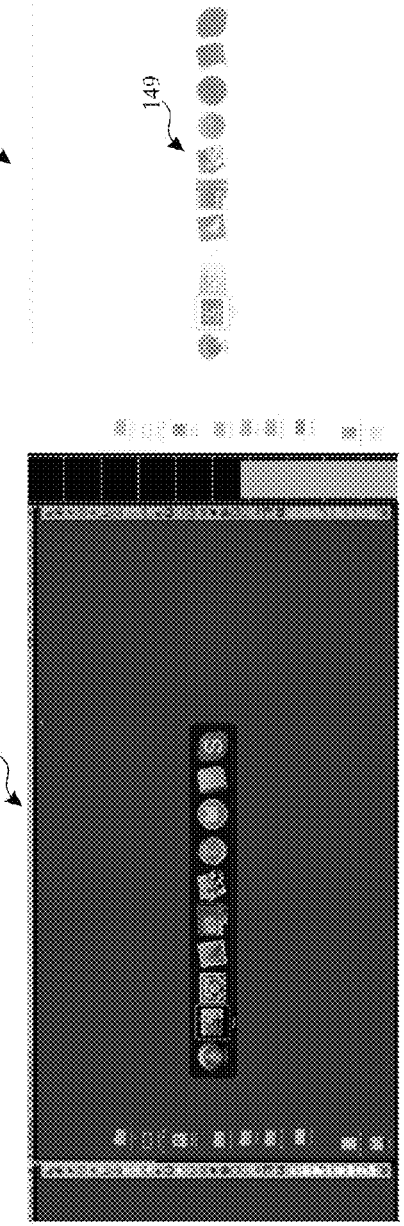
FIG. 8 is an example of the present adaptive dimming techniques, in accordance with an embodiment.

FIG. 8 illustrates a simplified example of the present adaptive dimming techniques. Specifically, FIG. 8 illustrates an original image 146 and an image 148 in which the present adaptive dimming techniques with local tone mapping have been applied. As illustrated by the image 148, the present adaptive dimming techniques with local tone mapping may preserve local contrast (e.g., as illustrated by the icon strip 149 in the image 148) instead of clipping and distorting pixel 102 values. Specifically, in one embodiment, the image 148 may include a preservation matrix in which only pixels 102 above the lower limit of the local contrast adjustment (e.g., $BL_3$) are corrected while neighboring pixels 102 remain unadjusted. That is, the present adaptive dimming techniques with local tone mapping may allow only the pixels 102 (e.g., which may correspond to a single segment of the light sources of the display 18) corresponding to the icon strip 149 in the image 148 to be adjusted in order to preserve the local contrast and to reduce the possibility of any image errors (e.g., clipping errors, halo artifacts, and so forth).

Figure 9:
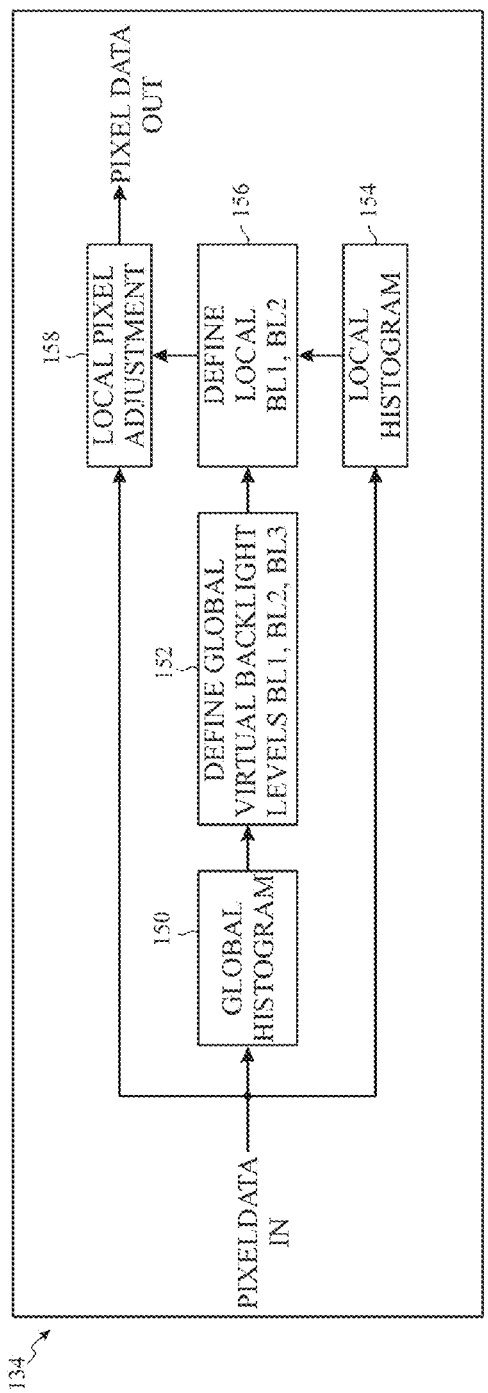
FIG. 9 illustrates one or more computational blocks that may be included as part of the adaptive dimming component of FIG. 6, in accordance with an embodiment.

FIG. 9 illustrates one or more computational blocks that may be included as part of the adaptive dimming component 134 (e.g., adaptive dimming algorithm(s) 134 and/or hardware components used to implement the adaptive dimming). Indeed, the computational blocks 150, 152, 154, 156, and 158 may include hardware, software, or some combination of hardware and software. As depicted, pixel data (e.g., image data 122) may be provided to a global histogram block 150, as well as a local histogram block 156 and local pixel adjustment block 158. Specifically, a global histogram may be generated by the GPUs 130 based on the pixel data (e.g., image data 122). As further depicted, global thresholds (e.g., global backlight thresholds $BL_1$, $BL_2$, and $BL_3$) may be generated via the global histogram block 150. Particularly, based on the generated global histogram, the three thresholds (e.g., global backlight thresholds $BL_1$, $BL_2$, and $BL_3$) may be defined, in which $BL_1$ may be defined as the upper limit of the local dynamic range and $BL_2$ may be defined as the lower limit of the local dynamic range via the local histogram definition block 156. Similarly, $BL_3$ may be defined as the lower limit of the local contrast adjustment (e.g., global threshold) such that brightness levels below $BL_3$ (e.g., outside the local adjustment area or outside of the local dynamic range) may not be adjusted.

For example, in one embodiment, the local dynamic range may be expressed as:

$$BL_2 \leq \text{Local Dynamic Range} \leq BL_1$$

As further depicted in FIG. 9, a local histogram may be generated via a local histogram block 154 based on the incoming pixel data (e.g., image data 122). In some embodiments, and as will be further appreciated with respect to FIG. 10, the local histogram may be representative of a single segment of pixels 102 and/or light sources (e.g., 1-dimensional (1-D) dimming) of the display 18, or multiple segments of pixels 102 and/or light sources (e.g., 2-D dimming). The local histogram definition block 156 may also define a target light source (e.g., backlight) brightness level for the local pixels 102. Thus, based on the local backlight levels $BL_1$ and $BL_2$ and the global backlight level $BL_3$, the pixel values of the incoming pixel data (e.g., image data 122) may be adjusted utilizing a local tone mapping function. In this way, the present adaptive dimming techniques with local tone mapping may reduce possible image errors (e.g., clipping errors, halo artifacts, and so forth) and power consumption while providing a high contrast ratio.

Figure 10:
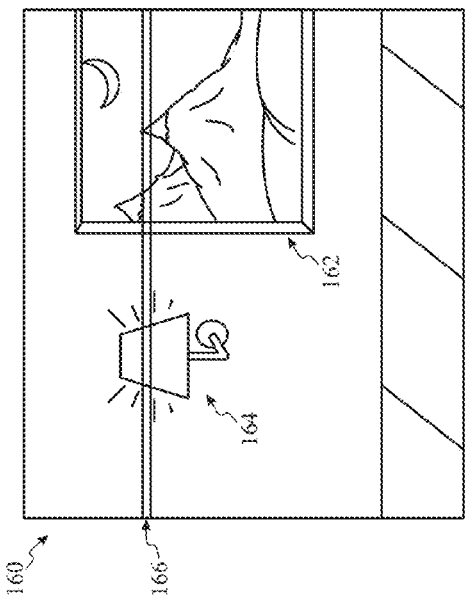
FIG. 10 illustrates an example of a cross section pixel map, in accordance with an embodiment.

FIG. 10 illustrates an image 160, which may be a still image or a video image displayed on the display 18. As an example, the image 160 may include images of a first object 162 (e.g., a wall mounted picture) and a second object 164 (e.g., a lamp). As may be appreciated, the first object 162 and the second object 164 may each include dark to bright pixels (e.g., pixel values). As illustrated, a local dynamic range 166 may be defined in the image 160. Specifically, as will be further appreciated with respect to FIG. 11, the image 160, and more specifically, the local dynamic range 166, may illustrate the aforementioned three thresholds $BL_1$, $BL_2$, and $BL_3$. For example, employing the present adaptive dimming techniques with local tone mapping may preserve the details and contrast of the image 160 (e.g., the second object 164 (lamp) may include brighter pixel content than that of the first object 162 (wall mounted picture)) without producing image errors (e.g., clipping errors, halo artifacts, and so forth).

Figure 11:
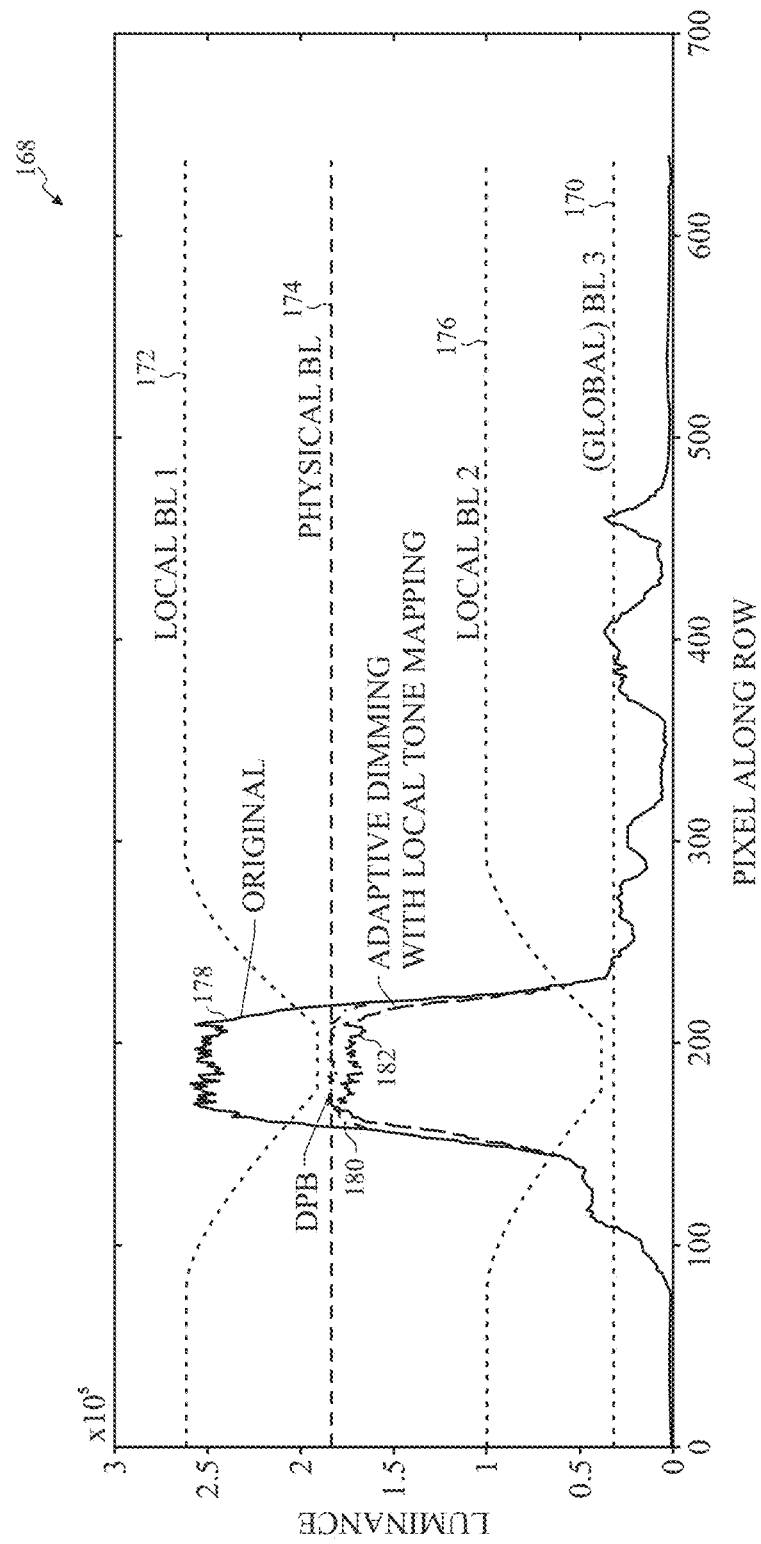
FIG. 11 is a plot diagram illustrating an example of a global and local histogram, global partial image data, and global full image data, in accordance with an embodiment.

FIG. 11 illustrates an example of a pixel map 168 or a local histogram of a 1-D or 2-D vertical segment of pixels 102 of the display 18 as plot of luminance (e.g., brightness) versus the number of pixels 102 within the local segment of pixels 102. Indeed, the pixel map 168 is an illustration of the operation of the three thresholds $BL_1$, $BL_2$, and $BL_3$, and the visual comparison of the present adaptive dimming techniques with local tone mapping and the previously discussed the DPB adaptive dimming technique as applied to horizontal segments of pixels 102. In one embodiment, the pixel map 168 may be representative of the local dynamic range 166 (e.g., a single segment of pixels 102 and a corresponding segment of light sources) as discussed above with respect to FIG. 10. As depicted by the pixel map 168 and previously noted above with respect to FIG. 9, the threshold 170 (e.g., $BL_3$) may be a global backlight level, and more specifically, the lower limit of the local contrast adjustment such that the luminance (e.g., brightness) of the pixels 102 below threshold $BL_3$ may not be adjusted.

However, on the other hand, the upper limit of the local dynamic range 172 (e.g., $BL_1$) (illustrated above the physical backlight 174 (e.g., "Physical BL")) and the lower limit of the local dynamic range 176 (e.g., $BL_2$) (illustrated below the physical backlight 174 (e.g., "Physical BL")) may each be locally adjusted to preserve the local contrast and luminance (e.g., brightness) of, for example, the segment of pixels 102 within defined by the local dynamic range 166 in the image 160 of FIG. 10. Specifically, as further depicted by the pixel map 168, the plot 182 (e.g., "Adaptive Dimming with Local Tone Mapping") illustrates that the luminance (e.g., brightness) and color preservation is markedly improved as compared to the original plot 178 (e.g., "Original") and the plot 180 (e.g., "DPB"). For example, the luminance (e.g., brightness), color, and/or other image or pixel content of the second object 164 (e.g., the lamp in the image 160 of FIG. 10) may be preserved while, for example, the image or pixel content of the first object 162 (e.g., wall mounted picture in the image 160 of FIG. 10) may be unadjusted.

FIG. 12 illustrates an example of a pixel map 184 or a local histogram of a 1-D or 2-D horizontal segment of pixels 102 of the display 18 as plot of number of pixels 102 within the local segment of pixels 102 versus gray level intensity. Indeed, the pixel map 168 is an illustration of the operation of the three thresholds $BL_1$, $BL_2$, and $BL_3$, and another visual illustration of the present adaptive dimming techniques with local tone mapping applied to vertical segments of pixels 102 (e.g., "Untouched Region," "Affected Region," and "Triggering Region"). As depicted by the pixel map 184 and previously noted above with respect to FIGS. 9 and 11, the threshold 186 (e.g., $BL_3$) may be the lower limit of the local contrast adjustment such that the luminance (e.g., brightness) of the pixels 102 below threshold $BL_3$ may not be adjusted (e.g., "Untouched Region").

Similarly, as discussed above with respect to FIG. 11, the upper limit of the local dynamic range 188 (e.g., $BL_1$) (beyond which is referred to as the "Triggering Region") and the lower limit of the local dynamic range 190 (e.g., $BL_2$) (between which is referred to as the "Affected Region") may each be locally adjusted to preserve the local contrast and luminance (e.g., brightness) of, for example, the segment of pixels 102 within defined by the local dynamic range 166 in the image 160 of FIG. 10. Furthermore, the pixel map 184 illustrates that only the pixels 102 in the "Affected Region" (e.g., pixels 102 to the left of the lower limit of the local contrast $BL_3$) may be adjusted while, in some embodiments, the majority of the pixels 102 may be unadjusted (e.g., pixels 102 in the "Untouched Region").

Figure 13A:
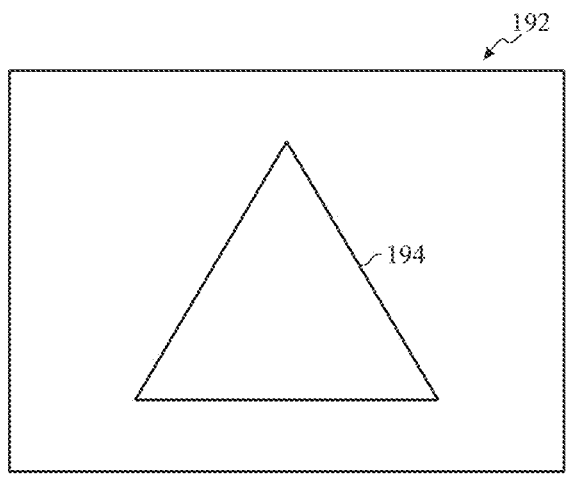
FIGS. 13A-13G display examples of the present adaptive dimming techniques with local tone mapping, in accordance with an embodiment.
Figure 13B:
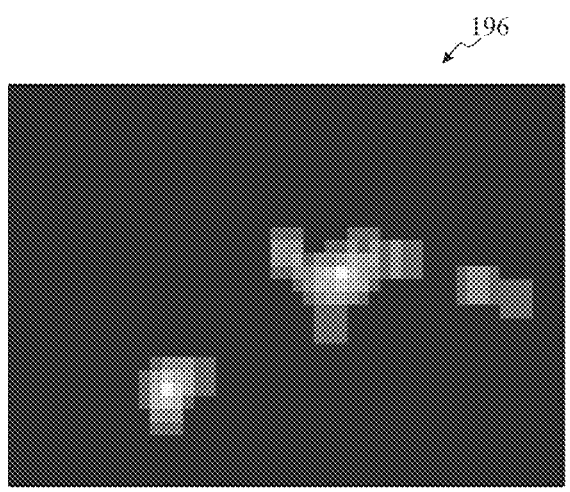
Figure 13C:
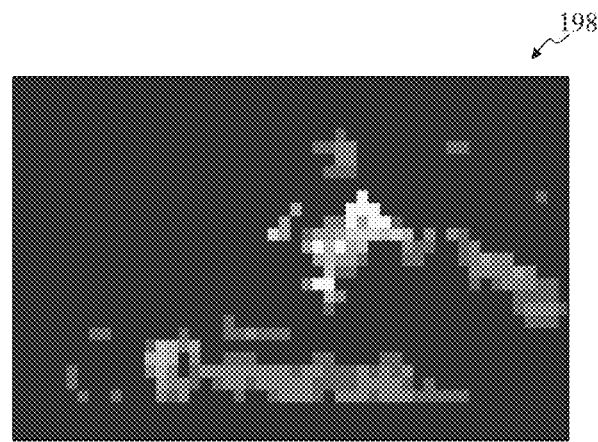
Figure 13D:
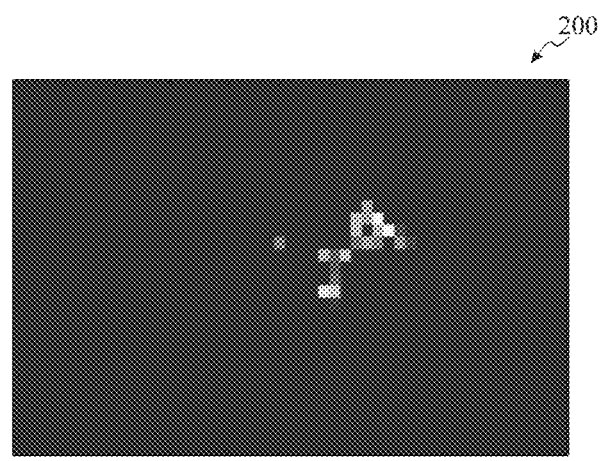
Figure 13E:
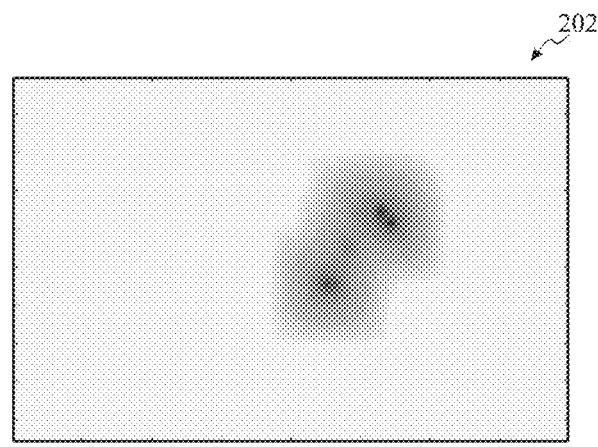
Figure 13F:
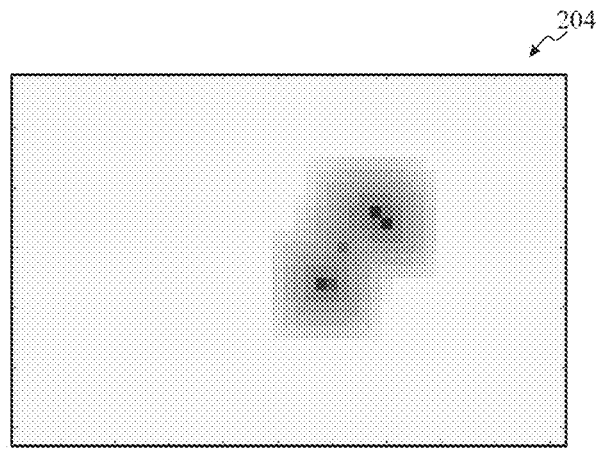
Figure 13G:
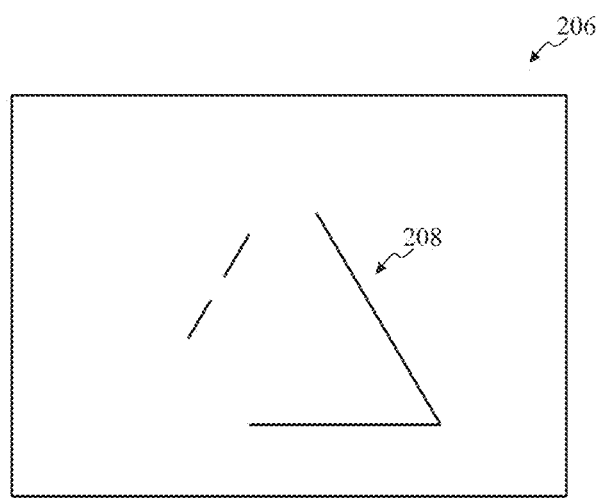

FIGS. 13A-13G display examples of the present adaptive dimming techniques with local tone mapping. For example, FIG. 13A depicts an original image 192, which includes an image 194 (e.g., an image of a triangle). In some embodiments, the original image 192 may be a still image (e.g., photo), or in other embodiments, the original image 192 may be a video image. Specifically, as will be appreciated from FIGS. 13A-13G, the present adaptive dimming techniques with local tone mapping may include utilizing and/or applying a preservation matrix (e.g., via the GPU(s) 130 executing the adaptive dimming component 134 as discussed above with to FIG. 6), which may include applying image correction for darker pixels and applying minimal image correction for brighter pixels. For example, as generally illustrated by the images 196, 198, 200, 202, 204, and 206 of FIGS. 13B-13G, a sequence of locally corrected pixels (e.g., pixels 102 above the lower limit of the local contrast $BL_3$) may be adjusted while the neighboring pixels 102 (e.g., pixels 102 below the lower limit of the local contrast $BL_3$) may remain unadjusted. The preservation matrix 208 of FIG. 13G depicts the pixels 102 of the original image that has been adjusted to preserve the expected luminance (e.g., brightness) of these pixels.

In certain embodiments, the adaptive dimming component 134 may include instructions to determine the luminance (e.g., brightness) preservation value and/or matrix based on, for example, the subpixel of the three subpixels of each pixel 102 with the maximum luminance (e.g., brightness). Thus, the adaptive dimming component 134 may perform a local histogram analysis to determine the expected brightness level for each local segment of pixels 102 (e.g., corresponding to a segment of light sources of the display 18). For example, the luminance levels (e.g., RGB color levels) of the local pixels 102 may experience a variation in gain (e.g., adaptive boosting) to preserve the expected luminance (e.g., brightness) while the neighboring pixels 102 may be adaptively dimmed or unadjusted to increase the contrast ratio of the image without causing image errors (e.g., clipping errors, halo artifacts, and so forth).

Figure 14:
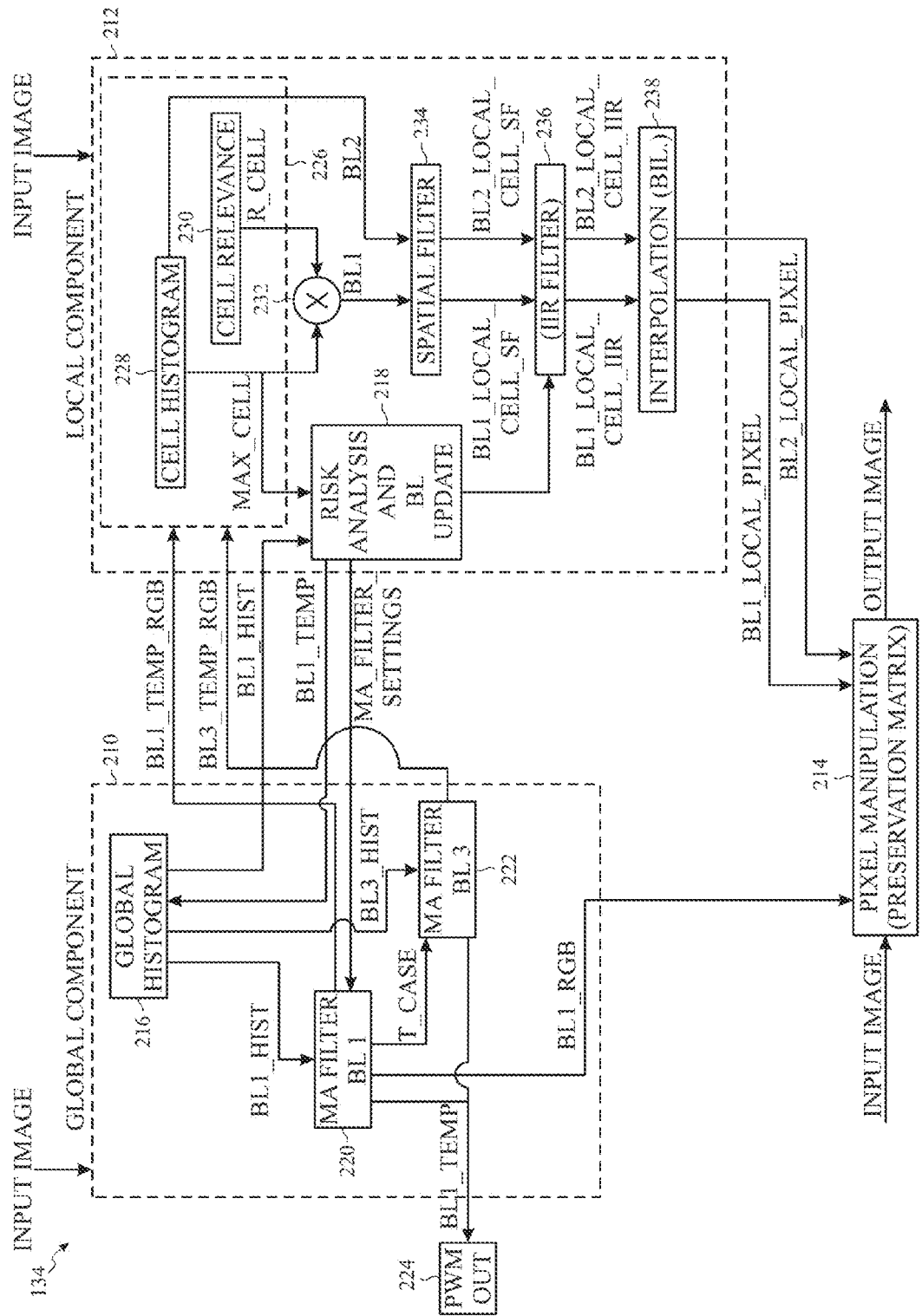
FIG. 14 illustrates a detailed embodiment of the adaptive dimming component of FIG. 6, in accordance with an embodiment.

FIG. 14 illustrates another detailed embodiment of the adaptive dimming component 134 (e.g., adaptive dimming algorithm(s) 134 and/or hardware components used to implement the adaptive dimming) of FIG. 6. In certain embodiments, as generally discussed above with respect to FIG. 9, the adaptive dimming component 134 may include a global computational component 210 and local computational component 212, which may each generate and supply pixel luminance analysis signals to a pixel manipulation component 214 (e.g., luminance and color preservation matrix). In certain embodiments, as further depicted in FIG. 14, the global computational component 210 may include global histogram block 216, which may generate a set of global thresholds (e.g., global backlight thresholds $BL_1$, $BL_2$, and $BL_3$).

In certain embodiments, the global computational component 210 may supply the global thresholds (e.g., $BL_1$, $BL_2$, and $BL_3$) to a risk analysis and backlight update block 218 of the local computational component 212. In some embodiments, the risk analysis and backlight update block 218 may be used to analyze and calculate a risk value based on, for example, the global thresholds (e.g., $BL_1$, $BL_2$, and $BL_3$) and the localized backlight levels $BL_1$ and $BL_2$. For example, in one embodiment, the risk analysis and backlight update block 218 may compute a risk value and/or apply a risk function that may be useful in determining, for example, the proper balance between dimming dark pixels and preserving the intended luminance (e.g., brightness) of bright pixels for one or more local segments of an image.

As further depicted, in certain embodiments, the risk analysis and backlight update block 218 of the local computational component 212 may supply a first input (e.g., filter settings) to a first filter 220 (e.g., moving average (MA) filter) of the global computational component 210 based on the global threshold $BL_1$. The risk analysis and backlight update block 218 may also supply a second input to a second filter 222 (e.g., MA filter) of the global computational component 210 based on the global thresholds $BL_2$ and $BL_3$. The risk analysis and backlight update block 218 may also supply a third input to the global histogram block 216 as a feedback signal indicating higher risk images (e.g., higher risk for pixel distortion and clipping errors) to be utilized by the global histogram block 216 as part of the calculation of the target backlight level.

In some embodiments, as further depicted, the risk analysis and backlight update block 218 may also receive local cell values from a local histogram block 226 (maximum cell relevance output from a cell histogram block 228), and determine a scene change ratio (e.g., strength and direction) based, for example, on a temporally filtered backlight level, the target backlight level, a previous target backlight level, and the scene change ratio. Based on these data, the risk analysis and backlight update block 218 may determine temporal filter setting to be supplied to the first filter 220 and a filter 236 (e.g., infinite impulse response (IIR) filter) to be utilized in the computation of the local backlight levels $BL_1$ and $BL_2$.

In some embodiments, the first filter 220 and the second filter 222 may calculate one or more sets of averages of the pixel content corresponding to the global threshold $BL_1$ and $BL_3$, respectively. The first filter 220 (e.g., MA filter) may also supply a signal indicative of a temporal component of the global threshold $BL_1$ to a pulse width modulation (PWM) block 224 and the local histogram block 226 of the local computational component 212 based on the luminance (e.g., brightness) of each RGB subpixel of, for example, pixels 102 of the segment of pixels 102. The second filter 222 (e.g., MA filter) may supply a corresponding signal indicative of the temporal component of the global thresholds $BL_2$ and $BL_3$ to a cell histogram block 228 based on the luminance (e.g., brightness) of each RGB subpixel of, for example, pixels 102 of the segment of pixels 102.

In certain embodiments, the outputs of the cell histogram block 228 and a cell relevance block 230 may be multiplied via a multiplier 232 to generate local threshold $BL_1$. The local threshold $BL_1$ may be then supplied to a spatial filter 234. The cell histogram block 228 may also generate local threshold $BL_2$ and supply the local threshold $BL_2$ to the spatial filter 234. In one embodiment, the local threshold $BL_1$ and the local threshold $BL_2$ may each include a different size or different magnitude or value. Indeed, in some embodiments, the local cell value for the local threshold $BL_2$ may be an average value of the histogram entries between the physical backlight level and 0 (e.g., relevant entries). For example, if the number of relevant histogram entries is deemed too low (e.g., lower than the global threshold $BL_3$), the global threshold $BL_3$ may be used as the lower bound (e.g., lower limit).

As further depicted in FIG. 14, the local threshold $BL_1$ and the local threshold $BL_2$ may be supplied to the filter 236 (e.g., infinite impulse response (IIR) filter), and these outputs may be provided to an interpolation block 238. The interpolation block 238 may then calculate local thresholds $BL_1$ and $BL_2$, and supply the local thresholds $BL_1$ and $BL_2$ (e.g., local backlight thresholds for each pixel or segment of pixels) to the pixel manipulation component 214 (e.g., luminance and color preservation matrix). In one embodiment, each local filter 236 may be then adaptive, in which the filter 236 length may be updated and/or adjusted on a frame by frame basis based on an input (e.g., filter settings input) provided the risk analysis and backlight update block 218. Thus, based on the local backlight levels $BL_1$ and $BL_2$ and the global backlight level $BL_3$, pixel manipulation component 214 (e.g., luminance and color preservation matrix) may used be used to adjust the pixel values of the incoming pixel data (e.g., image data 122) utilizing a local tone mapping function. In this way, the present adaptive dimming techniques with local tone mapping may reduce possible image errors (e.g., clipping errors, halo artifacts, and so forth) and power consumption while providing a high contrast ratio.

Figure 15:
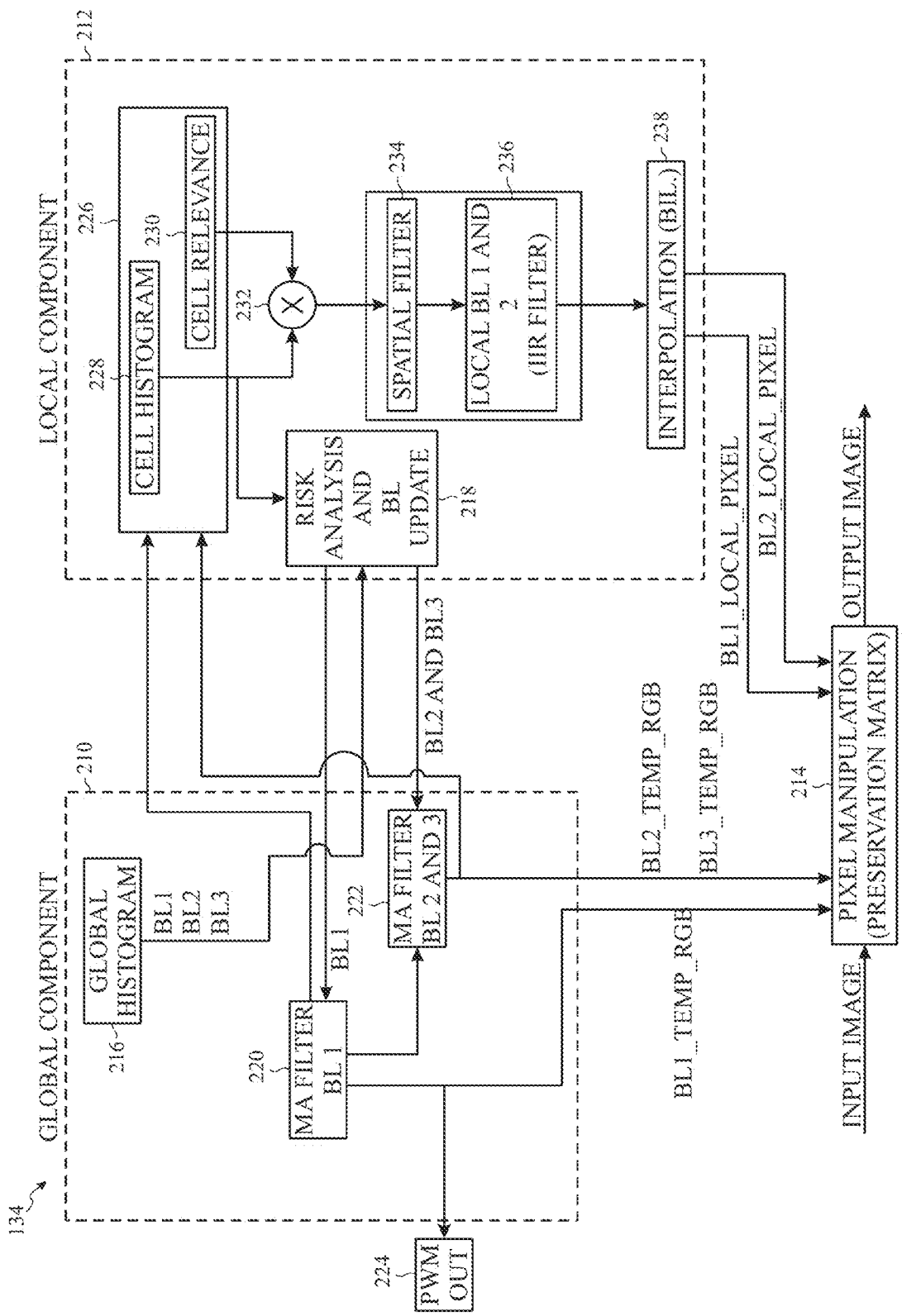
FIG. 15 illustrates another detailed embodiment of the adaptive dimming component of FIG. 6, in accordance with an embodiment.

FIG. 15 illustrates an alternative embodiment to that described with respect FIG. 14. Specifically, as depicted in FIG. 15, the calculations for the local thresholds $BL_1$ and $BL_2$ may not be performed in parallel (e.g., as discussed with respect to FIG. 14). For example, as depicted, the second filter 222 (e.g., MA filter) may supply a signal indicative of the temporal component of the global thresholds $BL_2$ and $BL_3$ to the cell histogram block 228 based on the luminance (e.g., brightness) of each RGB subpixel of, for example, pixels 102 of the segment of pixels 102. The second filter 222 (e.g., MA filter) may supply signals indicative of the temporal component of the global thresholds $BL_2$ and $BL_3$ to the cell histogram block 228 based on the luminance (e.g., brightness) of each RGB subpixel, and thus the initial local cell values for the local threshold $BL_2$ may not be determined based on the local histogram block 226 (e.g., as illustrated for the local threshold $BL_1$). The second filter 222 (e.g., MA filter) may also supply a signal indicative of the temporal component of the global thresholds $BL_2$ and $BL_3$ to the pixel manipulation component 214 (e g, luminance and color preservation matrix), as oppose to only the global threshold $BL_1$ as discussed above with respect to FIG. 14.

Figure 16:
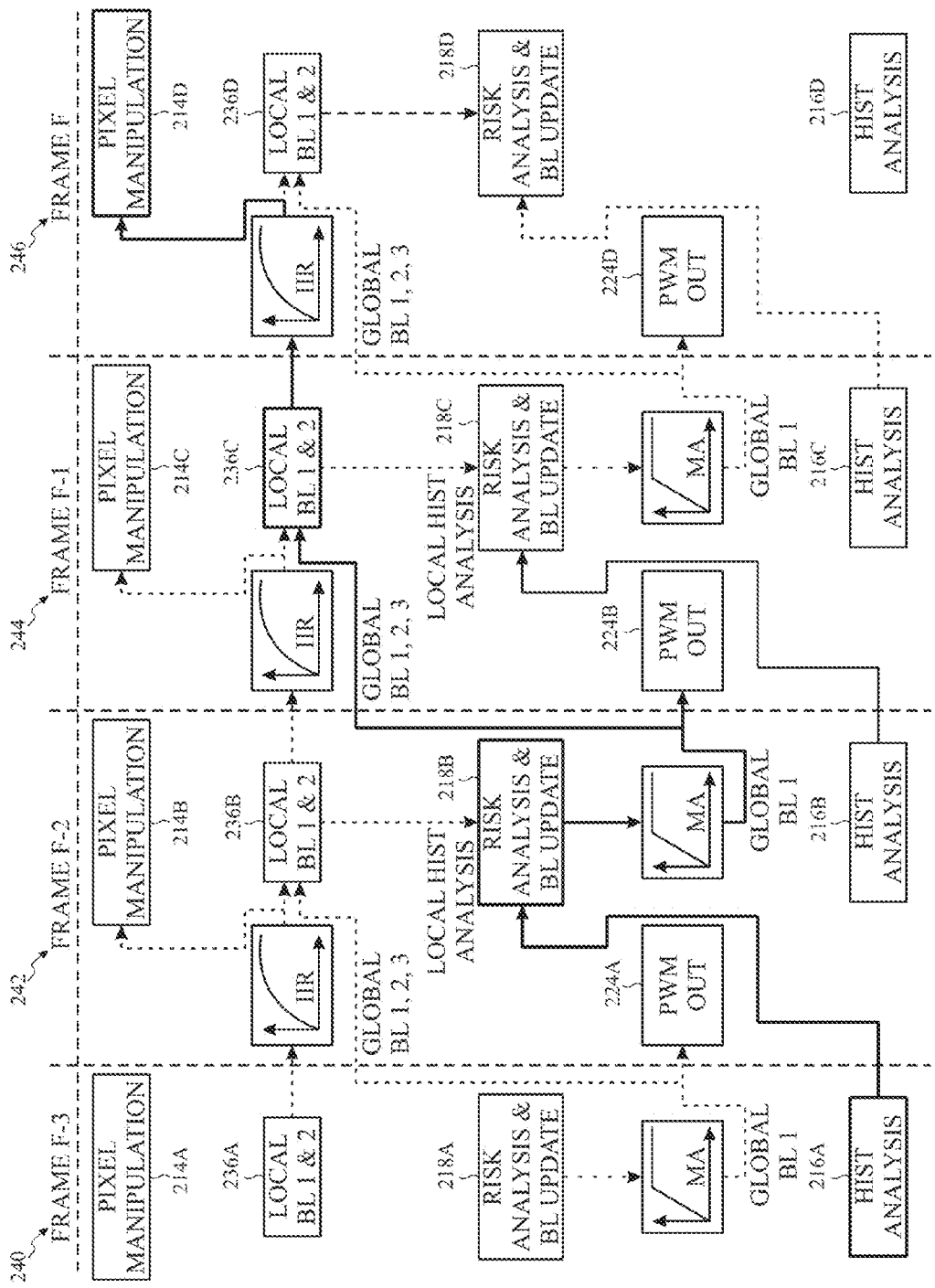
FIG. 16 illustrates a detailed embodiment of the adaptive dimming component of FIG. 6 including risk analysis with temporal integration, in accordance with an embodiment.

FIG. 16 illustrates another embodiment of the adaptive dimming component 134 (e.g., adaptive dimming algorithm(s) 134 and/or hardware components used to implement the adaptive dimming) of FIG. 6. Specifically, in one embodiment, FIG. 15 depicts an embodiment of the adaptive dimming component 134 (e.g., as previously discussed with respect to FIG. 14) with a frame by frame temporal integration, in which the luminance (e.g., brightness) of one or more pixels of each frame of pixels of the display 18 may be adjusted. For example, in certain embodiments, the adaptive dimming component 134 may be used to generate a number of pixel luminance (e.g., brightness) levels and histograms 216A, 216B, 216C, and 216D for each localized segment of pixels and/or corresponding light sources (e.g., backlights) of the display 18 and for each new frame of image data 240 (e.g., "Frame f-3"), 242 (e.g., "Frame f-2"), 244 (e.g., "Frame f-1"), and 246 (e.g., "Frame f").

In one embodiment, the pixel luminance of the image data may be spatiotemporally filtered. In another embodiment, the adaptive dimming component 134 may analyze the histograms 216A, 216B, 216C, and 216D without temporal filtering. As further depicted, the risk analysis and backlight update blocks 218A, 218B, 218C, and 218D of the respective frames of image data 240 (e.g., "Frame f-3"), 242 (e.g., "Frame f-2"), 244 (e.g., "Frame f-1"), and 246 (e.g., "Frame f) may compute a risk value and/or apply a risk function based on, for example, the respective histogram 216A, 216B, 216C, and 216D analysis data and local risk values generated from the previous frame of image data.

Similarly, the respective local threshold filters 236A, 236B, 236C, and 236D may generate the local backlight levels $BL_1$ and $BL_2$ for each of the respective frames of image data 240 (e.g., "Frame f-3"), 242 (e.g., "Frame f-2"), 244 (e.g., "Frame f-1"), and 246 (e.g., "Frame f) based on the respective global thresholds (e.g., $BL_1$, $BL_2$, and $BL_3$) and the local backlight levels $BL_1$ and $BL_2$ from the respective previous frames of image data 240 (e.g., "Frame f-3"), 242 (e.g., "Frame f-2"), 244 (e.g., "Frame f-1"), and 246 (e.g., "Frame f). Lastly, the pixels of a given frame 240 (e.g., "Frame f-3"), 242 (e.g., "Frame f-2"), 244 (e.g., "Frame f-1"), and 246 (e.g., "Frame f) may be adjusted based on, for example, respective local cell values of the previous frame 240 (e.g., "Frame f-3"), 242 (e.g., "Frame f-2"), 244 (e.g., "Frame f-1"), and 246 (e.g., "Frame f) and the respective current luminance level for the immediate frame 240 (e.g., "Frame f-3"), 242 (e.g., "Frame f-2"), 244 (e.g., "Frame f-1"), and 246 (e.g., "Frame f).

Figure 17:
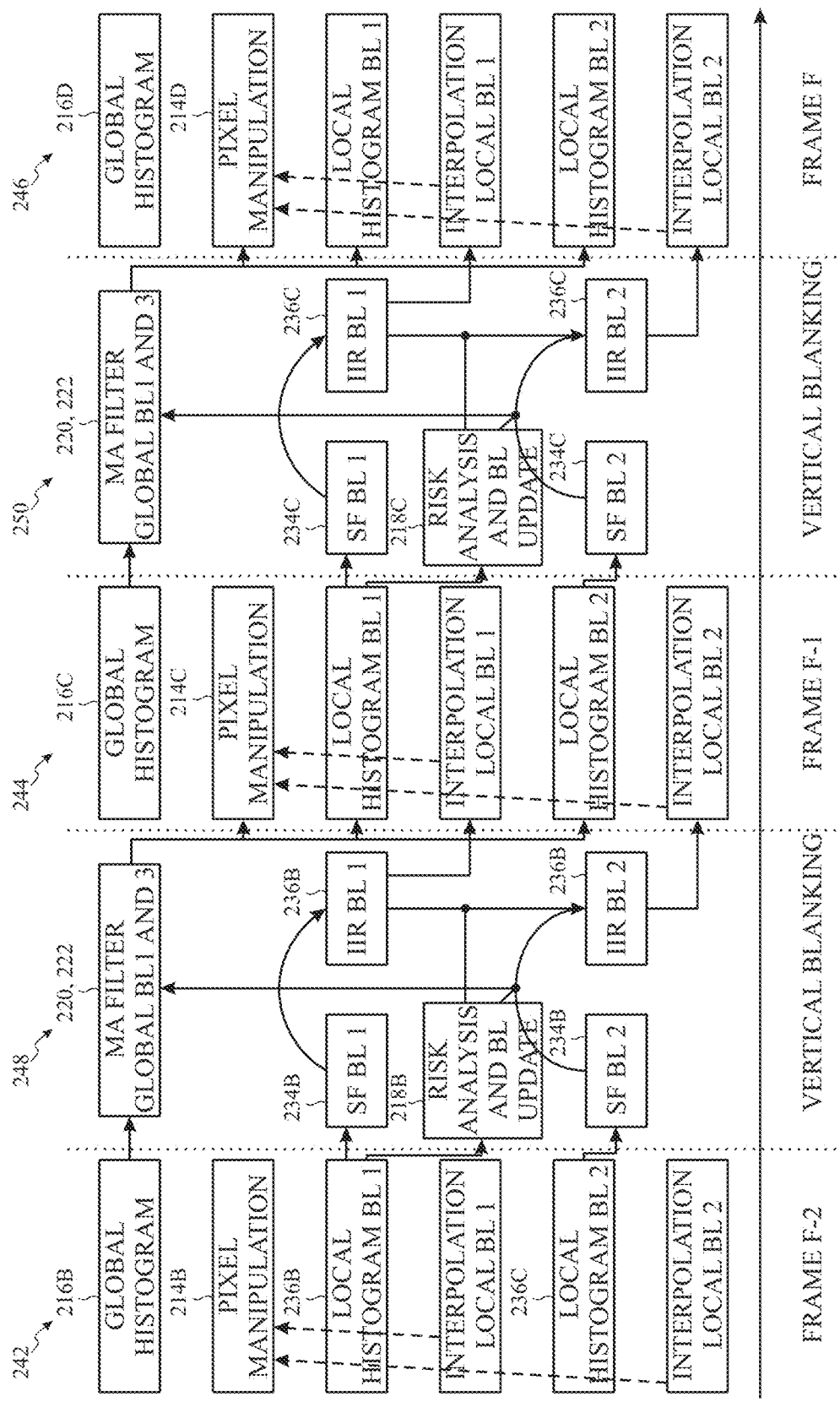
FIG. 17 illustrates another detailed embodiment of the adaptive dimming component of FIG. 6 including risk analysis and vertical blanking adjustments, in accordance with an embodiment.

FIG. 17 depicts an embodiment of the adaptive dimming component 134 with the frame by frame temporal integration as discussed with respect to FIG. 16, but illustrating that risk values are calculated by the respective risk analysis and backlight update blocks 218B, 218C, and 218D between each new frame of image data 242 (e.g., "Frame f-2"), 244 (e.g., "Frame f-1"), and 246 (e.g., "Frame f") during the respective vertical blanking periods 248 and 250 as illustrated. In this way, as previously discussed above with respect to FIG. 14, each local filter 236B, 236C, and 236D may be then adaptive, and thus allowing the length of each local filter 236B, 236C, and 236D to be updated and/or adjusted on a frame by frame basis based on real-time updated inputs (e.g., filter settings input) provided the respective risk analysis and backlight update blocks 218B, 218C, and 218D.

Figure 18:
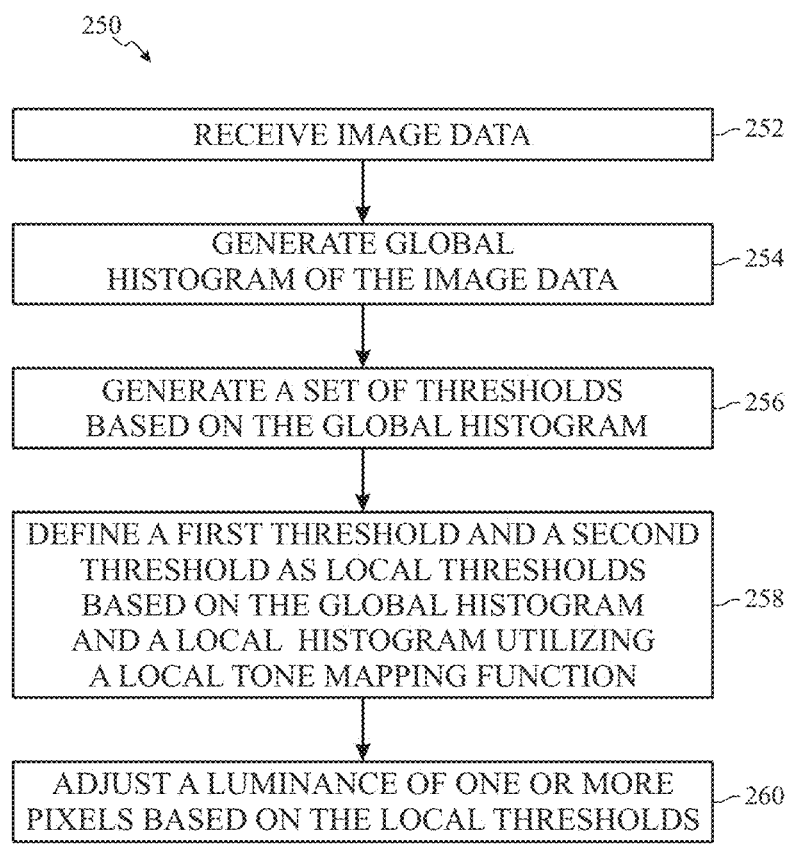
FIG. 18 is a flow diagram, illustrating an embodiment of an adaptive dimming process useful in reducing image errors and power consumption while providing a high contrast ratio, in accordance with an embodiment.

Turning now to FIG. 18, a flow diagram is presented, illustrating an embodiment of a process 250 useful in reducing image errors (e.g., clipping errors, halo artifacts, and so forth) and power consumption while providing a high contrast ratio by using, for example, the one or more the processor(s) 12 and/or GPU(s) 130 depicted in FIGS. 1 and 6. The process 250 may include code or instructions stored in a non-transitory machine-readable medium (e.g., the memory 14) and executed, for example, by the one or more processor(s) 12 and/or GPU(s) 130. The process 250 may begin with the GPU(s) 130 receiving (block 252) image data (e.g., image data 122). The process 250 may continue with the GPU(s) 130 performing (block 254) a global histogram analysis of the image data. The process 250 may then continue with the GPU(s) 130 generating (block 256) a set of thresholds based on the global histogram analysis. For example, the GPU(s) 130 may generate global thresholds $BL_1$, $BL_2$, and $BL_3$.

The process 250 may then continue with the GPU(s) 130 defining (block 258) a first threshold and a second threshold as local thresholds based on the global histogram analysis and a local histogram analysis utilizing a local tone mapping function. Specifically, as previously noted above with respect to FIGS. 9-11, based on the generated global histogram, the local thresholds $BL_1$ and $BL_2$ may be defined, in which $BL_1$ may be defined as the upper limit of the local dynamic range and $BL_2$ may be defined as the lower limit of the local dynamic range. The process 250 may then conclude with the GPU(s) 130 adjusting (block 260) the first and second thresholds to adjust a brightness adjust a luminance of one or more pixels of image data. For example, based on the local backlight levels $BL_1$ and $BL_2$ and the global backlight level $BL_3$, pixel manipulation component 214 (e g, luminance and color preservation matrix) may used be used to adjust the pixel values of the incoming pixel data (e.g., image data 122) utilizing a local tone mapping function. In this way, the present adaptive dimming techniques with local tone mapping may reduce possible image errors (e.g., clipping errors, halo artifacts, and so forth) and power consumption while providing a high contrast ratio.

Figure 19:
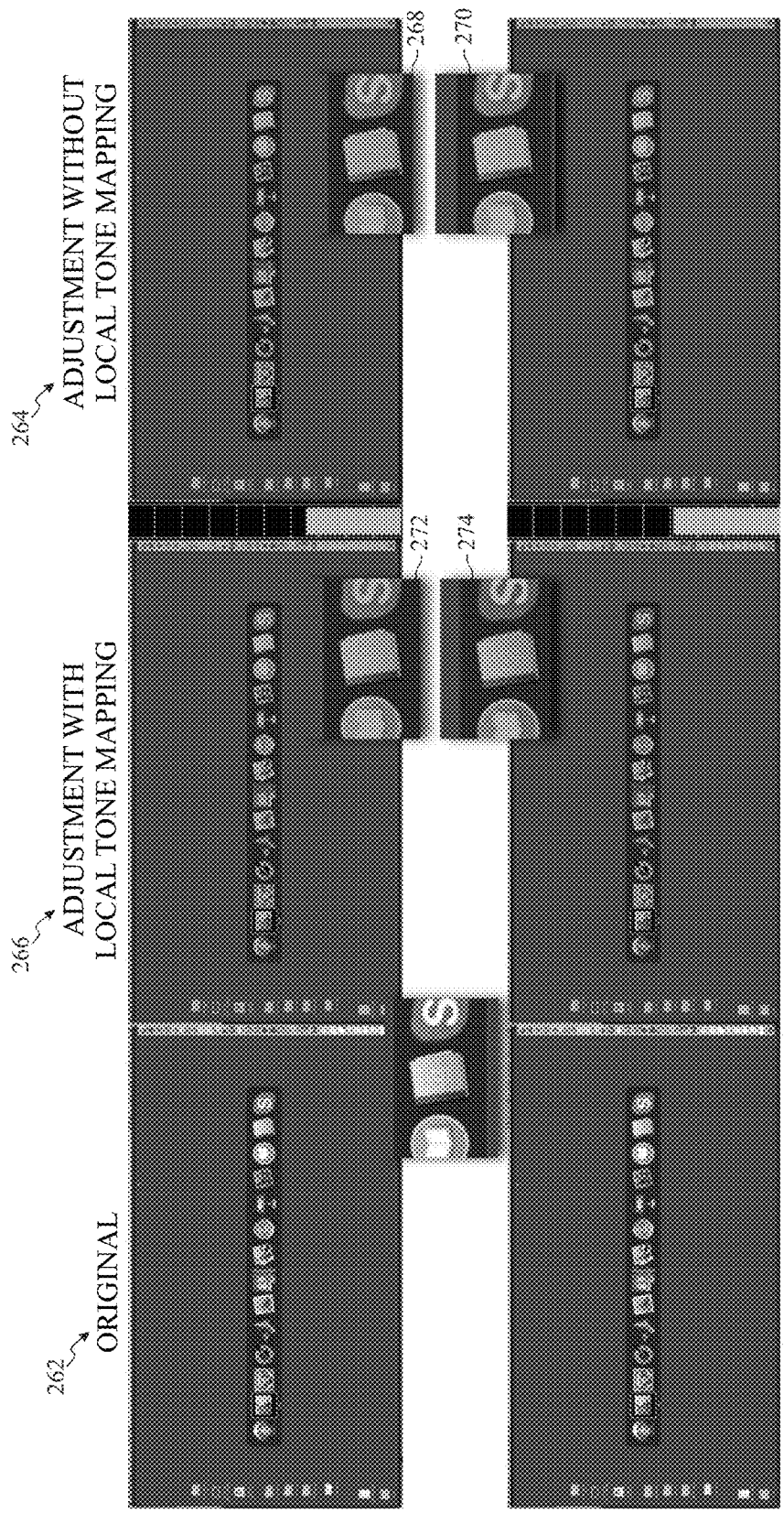
FIG. 19 illustrates simulation examples of images generated using the presently disclosed adaptive dimming with local tone mapping techniques, in accordance with an embodiment.

As another example, FIG. 19 illustrates simulation examples of an original image 262, and an image 264 generated without using the presently disclosed adaptive dimming with local tone mapping techniques including, for example, image artifacts (e.g., clipping errors, halo artifacts, and so forth) as compared to a similar image 266 generated using the presently disclosed adaptive dimming with local tone mapping techniques. For example, the image 264 generated without using the presently disclosed techniques includes flashing artifacts (e.g., halos) or washed-out pixels (e.g. clipping errors) (e.g., as may be viewed via the magnified portions 268 and 270 of the image 264). In contrast, the image 266 generated according to the presently disclosed techniques includes reduced and eliminated clipping artifact and improved contrast (e.g., as may be viewed via the magnified portions 272 and 274 of the image 266).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method, comprising:
receiving image data to be displayed on pixels of a display panel;
generating a global histogram of the image data;
generating a plurality of thresholds based on the global histogram, wherein generating the plurality of thresholds comprises generating a first global threshold, a second global threshold, and a third global threshold;
defining a first threshold and a second threshold of the plurality of thresholds as local thresholds based on the global histogram and a local histogram, wherein the first threshold and the second threshold are generated according to a local tone mapping function and each is based at least in part on a respective threshold of the plurality of thresholds; and
adjusting a luminance of one or more of pixels of the display panel based at least in part on the first threshold and the second threshold.

2. The method of claim 1, wherein generating the third global threshold comprises generating a lower limit of the luminance adjustment.

3. The method of claim 2, wherein adjusting the luminance of the one or more pixels comprises adjusting the luminance of one or more pixels having a luminance greater than the lower limit of the luminance adjustment.

4. The method of claim 1, wherein defining the first threshold comprises defining an upper limit of a dynamic range of a segment of the pixels.

5. The method of claim 1, wherein defining the second threshold comprises defining a lower limit of a dynamic range of a segment of the pixels.

6. The method of claim 1, wherein adjusting the luminance of the one or more pixels comprises increasing the luminance and preserving a local contrast of the one or more pixels.

7. A system, comprising:
a display panel comprising an array of pixels configured receive pixel data signals; and
a processor configured to:
generate a first local threshold and a second local threshold based on a plurality of global thresholds, wherein the first local threshold and the second local threshold are generated based at least in part on local tone mapping function and respective global thresholds of the plurality of global thresholds;
adjust a luminance parameter of the pixel data signals based at least in part on the first local threshold and the second local threshold; and
supply the adjusted pixel data signals to the display panel.

8. The system of claim 7, wherein the plurality of global thresholds comprises a first global threshold, a second global threshold, and a third global threshold, and wherein the first local threshold and the second local threshold are generated based at least in part on a local tone mapping function of the first global threshold and the second global threshold, respectively.

9. The system of claim 8, wherein the third global threshold comprises a lower limit by which to adjust the luminance parameter of the pixel data signals.

10. The system of claim 9, wherein the processor is configured to generate a contrast preservation matrix based on the first local threshold and the second local threshold, wherein the preservation matrix is configured to adjust the luminance of pixels above the lower limit while the luminance of pixels below the lower limit are unadjusted.

11. The system of claim 10, wherein the processor is configured to generate the contrast preservation matrix based on a histogram analysis of a luminance of each subpixel of the pixels.

12. The system of claim 8, wherein the first local threshold, the second local threshold, and the third global threshold are configured to define vertical segments of pixels or light sources of the display panel, and wherein the processor is configured adjust the luminance parameter of the pixel data signals comprising a luminance level beyond the third global threshold.

13. The system of claim 8, wherein the first local threshold, the second local threshold, and the third global threshold are configured to define horizontal segments of pixels or light sources of the display panel, and wherein the processor is configured adjust the luminance parameter of the pixel data signals comprising a luminance level between the first local threshold and the second local threshold.

14. The system of claim 7, wherein the first local threshold comprises an upper limit of a dynamic range of a segment of pixels of the display panel.

15. The system of claim 7, wherein the second local threshold comprises a lower limit of a dynamic range of a segment of pixels of the display panel.

16. A method for controlling a backlight of an electronic display, comprising:
receiving pixel data;
generating a first histogram based on the pixel data;
generating a first set of threshold values based on the first histogram, wherein a first threshold value and a second threshold value of the first set of threshold values are configured to represent a local upper limit of a dynamic range of the pixel data and a local lower limit of the dynamic range of the pixel data, respectively, based at least in part on a second histogram of the pixel data and a second set of threshold values for global image data containing the pixel data;

modifying a brightness value of a set of pixels having a brightness value between the local upper limit and the local lower limit, wherein modifying the brightness value of the set of pixels comprises increasing the brightness value of a first subset of the set of pixels while preserving the brightness value of a second subset of the set of pixels; and adjusting an intensity of at least a portion of the backlight of the electronic display based on the modified brightness value of the set of pixels.

17. The method of claim 16, wherein modifying the brightness value of the set of pixels comprises reducing a possibility of halo artifacts, clipping artifacts, or a combination thereof, from becoming apparent on the electronic display.

18. The method of claim 16, wherein modifying the brightness value of the set of pixels comprises reducing a power consumption of the electronic display.

19. The method of claim 16, wherein modifying the brightness value of the set of pixels comprises increasing a contrast ratio of the electronic display.

20. An electronic device, comprising:
a memory device configured to store one or more adaptive dimming components; and
a graphics processing unit (GPU) configured to execute the one or more adaptive dimming components, wherein the one or more adaptive dimming components comprises:
a global component configured to generate a first global threshold: $[BL]\_1$, a second global threshold: $[BL]\_2$, and a third global threshold: $[BL]\_3$ based on incoming image data;
a local component configured to receive the global thresholds $[BL]\_1$, $[BL]\_2$, and $[BL]\_3$ from the global component, and to generate a first local threshold based on the first global threshold: $[BL]\_1$ and a second local threshold based on the second global threshold: $[BL]\_2$; and
a pixel manipulation component configured to receive the global thresholds $[BL]\_1$, $[BL]\_2$, and $[BL]\_3$, the first local threshold, and the second local threshold, and to adjust a brightness of one or more segments of pixels of the image data based at least in part on the global thresholds $[BL]\_1$, $[BL]\_2$, and $[BL]\_3$, the first local threshold, and the second local threshold.

21. The electronic device of claim 20, wherein the pixel manipulation component is configured to adjust the brightness of the one or more segments of pixels by increasing a brightness level of a first set of pixels while preserving a brightness level of a second set of pixels neighboring the first set of pixels.

22. The electronic device of claim 20, wherein the local component is configured to calculate a risk value indicative of likelihood of image artifacts based at least in part on the global thresholds $[BL]\_1$, $[BL]\_2$, and $[BL]\_3$, the first local threshold, and the second local threshold.

23. The electronic device of claim 22, wherein the global component or the local component is configured to supply the risk value to the pixel manipulation component.

24. The electronic device of claim 20, wherein the global component is configured to adjust a temporal component of the global thresholds $[BL]\_1$, $[BL]\_2$, and $[BL]\_3$ before supplying the global thresholds $[BL]\_1$, $[BL]\_2$, and $[BL]\_3$ to the pixel manipulation component.

25. The electronic device of claim 20, wherein the local component is configured to adjust a spatial component of the first local threshold and the second local threshold before supplying the first local threshold and the second local threshold to the pixel manipulation component.

26. The electronic device of claim 20, wherein the GPU is configured to execute the one or more adaptive dimming components frame by frame, wherein a brightness of each frame of pixels is adjusted based at least in part on the global thresholds $[BL]\_1$, $[BL]\_2$, and $[BL]\_3$, the first local threshold, and the second local threshold of each preceding frame of pixels.

27. The electronic device of claim 20, wherein the pixel manipulation component is configured to supply the adjusted one or more segments of pixels to pixels of a display.

28. The electronic device of claim 20, comprising a display configured to display the image data.

29. A non-transitory computer-readable medium having computer executable code stored thereon, the code comprising instructions to:
cause a processor to receive image data to be displayed on pixels of a display panel;
cause the processor to generate a global histogram of the image data;
cause the processor to generate a plurality of thresholds based on the global histogram;
cause the processor to define a first threshold and a second threshold as local thresholds based at least in part on the plurality of thresholds, the global histogram, and a local histogram; and
cause the processor to adjust a luminance of one or more of pixels of the display panel based at least in part on the first threshold and the second threshold.

* * * * *